United States Patent

[11] 3,582,967

[72] Inventors George Beckman
Utica;
Tracy B. Gunderman, Clinton, both of, N.Y.
[21] Appl. No. 797,802
[22] Filed Feb. 10, 1969
[45] Patented June 1, 1971
[73] Assignee Digimetrics, Inc.

[54] WELD QUALITY INDICATOR
10 Claims, 2 Drawing Figs.
[52] U.S. Cl. ................................................. 219/109, 219/110
[51] Int. Cl. ................................................. B23k 9/10, B23k 11/24
[50] Field of Search .......................................... 219/108, 109, 110

[56] References Cited
UNITED STATES PATENTS
3,345,493 10/1967 Guettel et al. ................ 219/110
*Primary Examiner* — Bernard A. Gilheany
*Assistant Examiner* — Roy N. Envall, Jr.
*Attorney* — Sughrue, Rothwell, Mion, Zinn & MacPeak ABSTRACT: Apparatus is disclosed for developing a signal proportional to the total energy supplied to a weldment by the electrodes of an electrical welding machine during the welding cycle. The input signal to the apparatus is the AC voltage signal across the electrodes of the welding machine. The signal is rectified, and time integrated over the duration of the weld cycle. The integrated signal, which is proportional to the total energy delivered to the weldment, is compared to preset high and low reference levels. The result of the comparison indicates whether sufficient energy was supplied to the weldment to make a lasting weld.

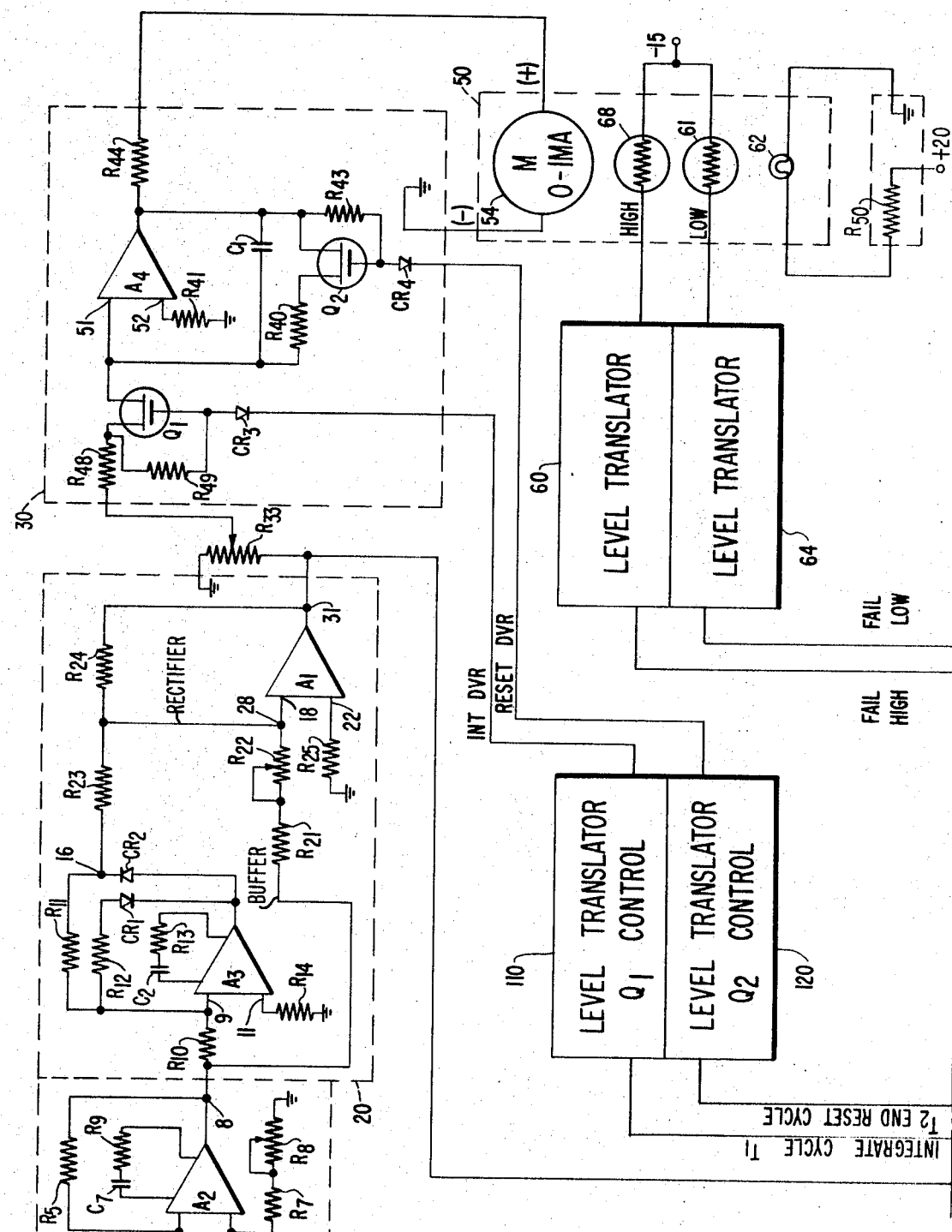

WELD QUALITY INDICATOR

BACKGROUND OF THE INVENTION

1. Field of the Invention

The invention relates generally to the field of devices for monitoring the total energy supplied to a weldment by a resistance welding machine, including indicating and feedback control means.

2. Description of the Prior Art

In the course of making a series of spotwelds using an electrical spot welding machine, there are many variable factors which can influence the ultimate strength of each weld. Among the factors to be considered are the condition of the welding machine electrodes, the electrode pressure, heat transfer rate of the electrode cooling system, changes in the welding machine's input line voltage; phase shift or heating of the thyratrons used to supply energy to the weld, and characteristics of the material being welded, such as its thickness or its surface condition. The present invention provides apparatus which takes into account all of the characteristics of the weld machine and the material being welded in providing an indication of the strength of the weld. Previously, the most common method of determining the strength of the spotwelds has been to make a number of destructive tests of some of the series of spotwelds, and based on these tests to make a statistical projection of the probable strength of the average weld in the series. But this method is slow, requiring frequent production stoppages, and expensive. It also will not detect the occasional bad weld which will occur in almost any series. The present invention provides apparatus for a nondestructive method of determining the strength of spotwelds. The invention further provides for testing every spotweld in the series, rather than just a few welds chosen at random.

Prior art weld monitor devices have sought to provide a means for testing the strength of every weld in a series by measuring the current applied to the weld, and comparing the instantaneous magnitude of this current to preset limits. But the instantaneous magnitude of this current does not provide sufficient information about a process wherein the weld strength depends on the total energy supplied over a period of time. The invention provides means for determining the total energy applied to the weld and utilizing this to judge weld strength.

Other prior art weld monitoring devices have sought to determine weld strength by taking the time integral of the current or voltage as measured in the welding circuits. But, most of the prior art devices did not take their input directly across the welding electrodes, which is the only point at which a truly accurate measurement of the variables affecting weld strength can be made. Nor did any of these prior art devices provide the accuracy and ease of use provided by the present invention.

SUMMARY OF THE INVENTION

The invention may be broadly summarized as being directed to a weld monitoring device which accurately determines the total energy delivered during the welding cycle to a spotweld by a standard electrical welding machine. The input voltage signal to the monitoring device is the voltage drop across the welding electrodes of the machine. The signal is conditioned to eliminate common mode distortion, and is then applied to a precision rectifier which converts a previously bipolar signal to a unipolar signal.

The unipolar voltage signal is then applied to an integrator which takes the integral of the voltage over the time required to complete the welding cycle. The integrator is controlled by gating signals derived from the voltage signal measured across the electrodes as it is applied to the weldment to be made. The gating signals control the Integrate, Hold, and Reset modes of the integrator. The magnitude of the resulting voltage signal which is the integrator output is a function of both the time required to make the weld and the electrical phenomena occuring within the weld. The integrator output voltage is compared to predetermined upper and lower reference levels, and audible and visual indication is given of the results of the comparison. The integrator output voltage is also used as the process control variable in a feedback loop to the welding machine. The weld cycle is continued until the output voltage exceeds the predetermined lower limit.

BRIEF DESCRIPTION OF THE DRAWINGS

FIG. 1A is a schematic diagram of the circuitry necessary to take the time integral of the voltage appearing across the welding machine electrodes.

DETAILED DESCRIPTION OF THE DRAWINGS

Figure 1B:
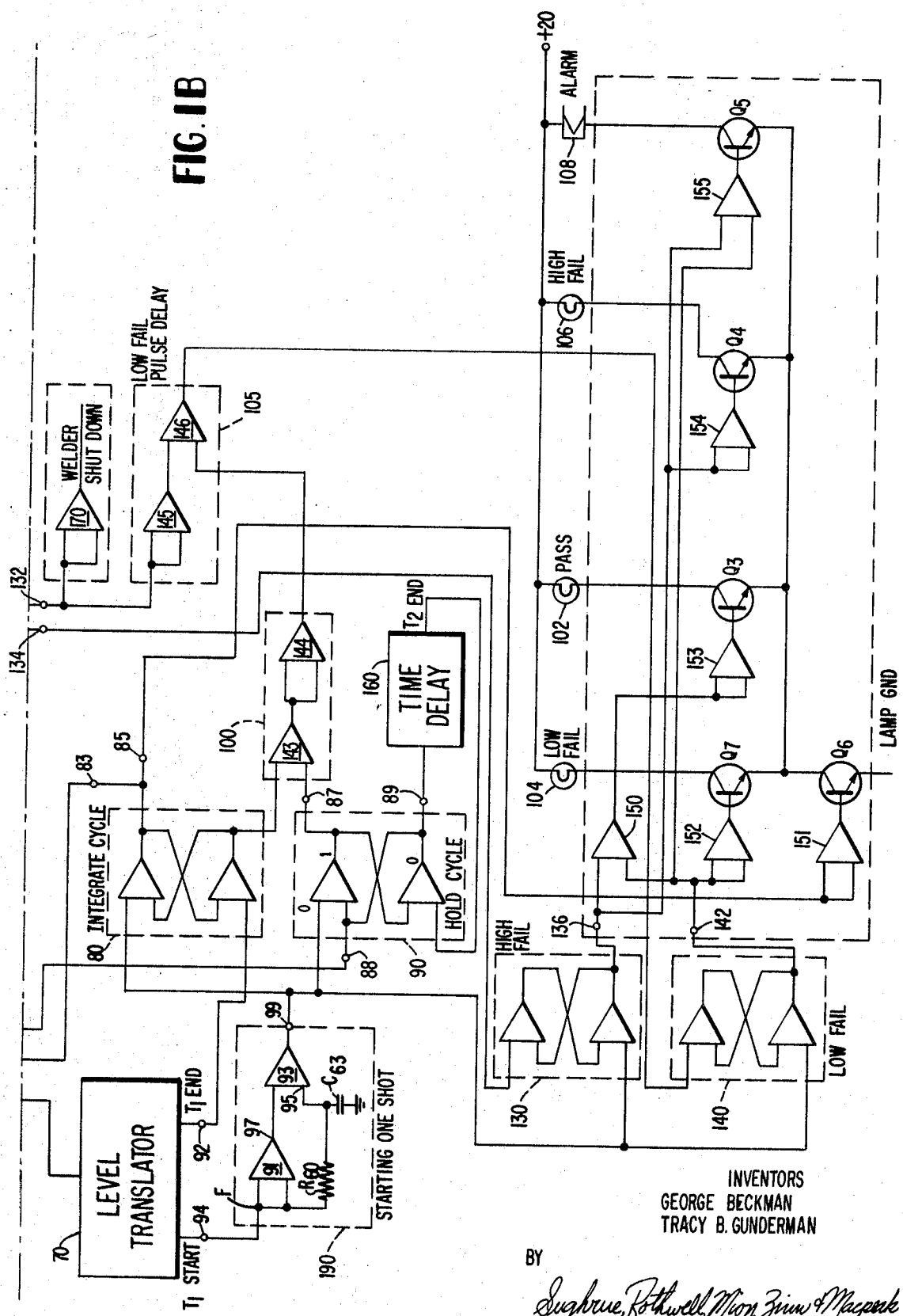
FIG. 1B is a block diagram of logic circuitry used to control the modes of the integrator and to indicate a pass or fail result for each weld tested.

Referring to FIG. 1A, apparatus is shown for taking the time integral of the voltage drop across the electrodes 1, 2 of a conventional electric resistance type of spot welding machine over the time period of the welding cycle. The time integral of the voltage is proportional to the total energy delivered to a weldment 3 over the welding cycle. The schematic diagram of FIG. 1A shows a signal conditioner 10, a rectifier 20, an integrator 30, and a meter 50.

Signal conditioner 10 comprises buffer amplifier A2 and its associated input resistance network. Input leads 6, 7 apply the voltage drop across the electrodes of the welding machine (not shown) to the buffer amplifier A2, which is a differential amplifier of conventional design, through a balanced resistive network in which the sum of R4 plus R5 is exactly equal to the sum of R6+R7+R8, where R8 is adjustable to correct for any imbalance of the resistors. Thus, equal gain is applied to the input signals on lines 6 and 7, and the amplifier output 8 is a voltage signal which has positive and negative swings of equal magnitude, and which is free of all common-mode distortion. Resistors R1, R2, and R3 are used to guarantee a matched low impedance input line. When the welding electrodes are open, the buffer amplifier inputs are pulled down to ground through these resistors. The combination C7, R9 is a stabilization network.

The voltage signal output from signal conditioner 10 is applied to a precision rectifier 20, which comprises operational amplifiers A1, A3 and the associated resistors and diodes, as will be explained more fully below.

The first half of this precision rectifier is a conventional operational amplifier A3; a signal applied to the negative input 9 of this amplifier has an applied gain of exactly one as determined by resistors R10, R11 and R12. Positive input 11 of amplifier A3 is returned to ground through a resistor R14 which for greater precision is equal to the input resistance to input 9. Amplifier A3 as a stabilization network C2, R13. Amplifier A1, the second half of this precision rectifier, also is a conventional operational amplifier having a gain of one as determined by R21 and R22, R23 and R24. Resistor R22 is a precision adjustment resistor which is set so that the input signal labeled "buffer" produces exactly twice as much current into node 28 as the signal labeled "rectifier" for reasons which will be explained below. Positive input 22 is returned to ground through resistor R25 which is equal to the input resistance to negative input 18.

The feedback loop of amplifier A3 has two diodes, CR1 and CR2, in reverse of each other. Thus, the only time the signal "rectifier" goes positive is when the amplifier output is positive and the amplifier input 9 is negative. When the amplifier output goes negative, the potential measured at pin 16 is at ground. Thus, the output signal "rectifier" as measured at pin 16 is a half-wave positive-going signal whose magnitude is equal to the magnitude of the input signal as measured at pin 8. The "rectifier" signal is one input to the second section of rectifier 20, which is amplifier A1. The other input signal is the signal labeled "buffer" which is a full-wave signal whose magnitude is equal to the magnitude of the "rectifier" signal.

As was pointed out above the "buffer" signal encounters exactly twice as much resistance, into node 28 as does the rectifier signal, R21 and R22, being twice as great as R23. Thus, the rectifier signal produces exactly twice as much current as the buffer signal into node 28. Also, the rectifier signal is 180° out of phase with the buffer signal, since the output of amplifier A3 is inverted from its input. Thus, at node 28, when the buffer signal is going positive, the rectifier signal is at ground; when the buffer signal is going negative, the rectifier signal is going positive with a magnitude twice that of the buffer signal. The result is that the input to amplifier A2 is a full-wave rectified signal and the output 31 is a signal labeled full-wave, inverted from the input. The full-wave signal is applied to a gain-controlling potentiometer 33 and then to integrator 30.

Integrator 30 takes the integral of the input full-wave signal as it appears across potentiometer 33 over the total time that energy is supplied to the weldment. Amplifier A4 is a conventional operational amplifier having the full-wave signal applied to input 51 through field effect transistor switch Q1, and having its other input returned to ground through resistor R41. Amplifier A4 has a high input impedance so that it cannot discharge integrating capacitor C1. The charge on the capacitor is registered through current limiting resistor 44 on meter 50.

Meter 50 is a standard milliammeter having display face 54 and meter photodiodes 68 and 61 illuminated by light source 62. Meter photodiodes 68, 61 are positioned on the face of meter 54 to establish the acceptable high and low reference levels respectively of input current to the meter, and thus the acceptable limits of the charge on capacitor C1. The photodiodes operate in the following manner. As long as the photodiodes (which is set up directly on the face of the meter) is illuminated by the light source, the diode output voltage signal is constant. If the illumination is interrupted by the meter needle (not shown) passing between the light source and the diode, the level of the diode output voltage signal changes. In this specific embodiment; the diode output signals are applied to conventional level translators 60, 64. The level translators generate binary output signals which change in state in response to a change in input signal level. Thus, if the output of translator 60 is normally high, a change in the level of the associated diode output signal, caused by interruption of its illumination, will result in a change of the translator output signal to a low level. In this manner, the level translators 60, 64 respond to the output signals of meter photodiodes 68, 61 to generate binary output signals indicating low failure, pass, or high failure. The translator output signals are used to control logic devices in a manner more particularly shown and described in FIG. 1B.

Field effect switching transistor Q2 is used to discharge capacitor C1 at the end of a welding cycle. Resistors R43, R49, R48, and R40 act as biasing and current limiting resistors for transitor switches Q1 and Q2. Diodes CR3 and CR4 are to prevent switching of these transistor switches by spurious signals.

Integrator 30 operates in one of three modes, Integrate, Hold, or Reset, with the modes controlled by transistor switches Q1 and Q2. When the integrator is in the Integrate mode, switch Q1 is closed and switch Q2 is open, and capacitor C1, responsive to the full-wave signal now applied, takes on a charge which is a function of the magnitude of the voltage drop across electrodes 1, 2 and the time period for which this voltage is applied to the weldment. The capacitor charge is proportional to the total energy supplied to the weldment, and controls the deflection of the needle on face 54 of milliammeter 50. At the end of a period of time which shall be called weld cycle or time period T1, switch Q1 opens, switch Q2 remains open and the integrator switches to the Hold mode. The integrator is now integrating a zero input so the deflection of the meter needle remains constant, allowing time for an accurate reading of the meter to be taken. The combined time for the Integrate and Hold modes is time period $T_2$. At the end of the time period $T_2$, switch Q2 closes, while switch Q1 remains open, discharging C1. The integrator is now is the Reset mode, which prepares the integrator for the next weld cycle. The states of transistor switches Q1 and Q2 are controlled by conventional level translators 110 and 120 respectively. The level translators have as their inputs binary signals generated by logic devices to be described more particularly in connection with FIG. 1B. The outputs of the translators are analog signals which serve to bias transitor switches Q1 and Q2 into their open and closed states, thus controlling the modes of integrator 30 in response to the binary signals.

The logic circuitry which determines whether the charge on capacitor C1 (and therefore, the energy applied to weldment 3) is within preset limits will now be explained in connection with FIG. 1B. The result of the determination is expressed by an illumination of the pass lamp 102 if the charge is within the limits. If the charge is outside the limits, an illumination of the Fail High lamp 106 or the Fail Low lamp 104 indicates which type of failure occurred. In the event of a failure, an alarm 108 is also triggered In the block diagram of the logic circuitry, all the logic gates which appear on the drawings are NAND gates; the output of a NAND gate is a high level for all conditions except the condition in which both inputs are high, in which case the output is a down level. The logic circuitry also makes use of four flip-flops 80, 90, 130 and 140, each of which consists of a pairs of NAND gates which are cross-coupled in a manner well known in the art to produce output signal which are flipped in response to set and reset input signals.

The full-wave rectifier output signal is picked off rectifier output 31 (FIG. 1A) and applied as the input to a conventional level translator 70. The level translator translates an analog input into a binary high-down output which can be used to control logic gates of the logic circuitry. The level translator herein senses the start of the full-wave signal and in response thereto generates a down-level output $T_1$ START on line 94. The output is applied to starting pulse one-shot 190 which generates a start pulse, which is down-level pulse of short duration, to set flip-flops 80, 190, 130 drawings 140 to their proper initial state. The start pulse is generated by the combination conditions except gates 91 and 93 and the are delay RC combination of resistor R60 is capacitor C63. Prior to the start of the weld cycle, line 94 is carrying a high level to the input pin F of starting one-shot 190. The result is a down level at output pin 97, a high level at input pin 95, and a high output level on line 99. When the rectifier full-wave signal generated during the weld cycle is applied to level translator 70 a down level is applied to pin F of single shot 190, instantly changing the output at pin 97 to a high level. Thus, one input to gate 93 is changed to high; the other input remains momentarily high despite the down level at pin F because of the time delay presented by the RC combination. The result is a down pulse output on line 99 of a duration equal to the time delay. The start pulse sets flip-flops 80 and 90 and resets flip-flops 130 and 140. The start pulse is necessarily of short duration to allow the flip-flops to be reset at the proper times during the welding cycle.

Setting the integrate cycle flip-flop 80 generates a high level on line 83, which is applied to the input of conventional level translator 110. The translator controls the state of field effect transistor switch Q1 by converting the high and down level outputs of flip-flop 80 to the analog voltages necessary to open and close the switch. The high level output holds the switch Q1 closed, placing the integrator in the Integrate mode as explained above. At the end of the weld cycle the full-wave signal at output pin 31 will return to ground. The output of level translator 70 on line 92, which is high during the weld cycle, goes to a down level at the end of the cycle. The down level resets the integrate cycle flip-flop 80, the signal on line 83 is now a down level, and level translator 120 opens switch Q1 ending the Integrate cycle.

The start pulse also sets hold cycle flip-flop 90, producing a high level on line 87 and a down level on lines 88, 89. The down level is applied via line 88 to conventional level translator 120 which controls the states of transistor switch Q2. As long as the signal level remains down, the switch Q2 is held open. The same down level is applied to a conventional time delay device having a time delay equal to time period $T_2$, which was defined above as being equal to the sum of the time periods for the Integrate and Hold cycles. At the end of time period $T_2$, the output of the delay device being coupled to the reset input of the hold cycle flip-flop, the down level resets the flip-flop generating a high level on output line 88 which is applied by level translator 120 to close switch Q2 and initiate the Reset mode.

The down-level output of the integrate cycle flip-flop is also applied via line 85 to inverter 151 and then to lamp driver transistor Q6. The driver transistor will turn on any lamp, or the alarm, unless the circuit path is closed by a down-level input applied to lamp control transistors Q7, Q3, Q4 and Q5. The apparatus for developing the high and down levels at the inputs to these control transistors will now be discussed.

Meter 50, as explained above, indicates the amount of charge on capacity C1, and also contains two meter photodiodes 68, 61. These photodiodes are placed on the face 54 of meter 50 to represent the acceptable high and low limits of the charge on the integrating capacitor. The outputs of these diodes are applied to their respective conventional level translator 60, 64, which develop binary output signals to be applied through the logic circuitry to control transistors 102—108.

Responsive to the input of the low diode 61, translator 64 applies to low line 132 a down level to indicate failure and a high level to indicate pass; the switch from down level to high level is made when the needle on the face of the meter passes between light source 62 and diode 61, momentarily changing the current level input to translator 60. Operating in the same manner, the outputs of translator 68 on high line 134 are a high level indicating pass and a down-level indicating failure.

Considering first the high fail flip-flop, the flip-flop is reset by the start pulse, applying a high level to output line 136 which, applied to inverter 154, holds the high fail lamp off; also, the high level on line 136 in combination with the high level on low fail flip-flop output line 142 causes NAND gate 155 to generate a down level to hold the alarm off. In the case of a high failure, the resulting down level sets flip-flop 130, generating a down level on line 136; in response to the down level, high levels are generated by NAND gate 155 and inverter 154 turning on the high fail light and the alarm.

The low fail flip-flop 140 is also reset by the start pulse; the resulting high level on line 142, applied to inverter 152 and gate 155, holds off the low fail light and the alarm. The level translator connected to the low diode has a down-level output, indicating failure, during a part of the integrating cycle while integrating capacitor C1 is charging; however, the down level is only of interest if it continues after the end of time period $T_1$, the welding cycle. Therefore, the down level is applied to low fail pulse delay 105, which consists of inverters 144, 145 and gates 143, 146. Gate 146 will only generate a down level, indicating a low failure and setting the low failure flip-flop, in response to high level inputs from both inverters 144 and 145. Inverter 145 produces a high level output in response to a low failure, or down level, input; and inverter 144 only produces a high level in response to a down level from gate 143, which requires high level signal inputs from the set output of flip-flop 90 indicating the start of time period $T_1$, and the reset output of flip-flop 80, indicating the end of period $T_1$. Thus, if the down-level signal output of low level signal translator 64 continues past the end of $T_1$, the low-fail flip-flop is set and the low-fail lamp and the alarm are turned on.

If neither a high nor a low failure is indicated, then the reset outputs of both flip-flops 130 and 140 remain high and are applied to gate 150 and inverter 153 to turn on pass lamp 102.

Inverter 170 is used to pick off a signal for a feedback control system. The output signal will remain high until such time as the charge on capacitor C1 reaches the preset minimum level indicating that an acceptable amount of energy has been applied to the weldment; the signal level will then go down, generating a signal to be used to shut down the welder.

While the invention has been particularly shown and described with reference to preferred embodiments thereof, it will be understood by those skilled in the art that various changes in form and details may be made therein without departing from the spirit and scope of the invention.

What we claim is:

1. In combination with an electric spotwelding machine having two electrodes through which energy is supplied to a weldment during the welding cycle, a device for monitoring the total energy supplied to the weldment during the weld cycle, said device comprising:
   a. means connected to said two electrodes for rectifying the voltage across said electrodes,
   b. gating means connected to said means for rectifying for generating a start and end welding cycle signal,
   c. integrating means connected to said rectifying means and said gating means for integrating the output of said rectifying means between said start and end signals to develop a signal which is proportional to the energy supplied by the electrodes between the start and end signals; and
   d. indicator means coupled to said integrating means for indicating the integrated output from said integrating means.

2. A monitoring device as claimed in claim 1 wherein said integrating means comprises a capacitive storage means responsive to said rectifying means output and said gating means for storing a charge proportional to the total energy supplied to the weldment during the weld cycle.

3. A monitoring device as claimed in claim 2 wherein said gating means further comprises a timing means responsive to said start signal for generating a reset signal a predetermined time after the occurrence of said start signal, and said integrating means further comprises switching means responsive to said start, end, and reset welding cycle signals for controlling the charge and discharge times of said capacitive storage device.

4. A monitoring device as claimed in claim 3 wherein said capacitive storage means comprises an operational amplifier with a feedback capacitor.

5. A monitoring device as claimed in claim 4 wherein said switching means comprises a first transistorized switch connected between said rectifying means output and said operational amplifier input for connecting said rectifying means output to said operational amplifier input in response to said start signal and disconnecting said rectifying means output from said operational amplifier input in response to said end signal.

6. A monitoring device as claimed in claim 5 wherein said switching means further comprises a second normally open transistorized switch, connected across said feedback capacitor, responsive to said reset signal for closing and discharging said feedback capacitor.

7. A monitoring device as claimed in claim 6 wherein said indicating means includes display means connected to said integrating means, for comparing the output of said integrating means with predetermined reference levels, and generating a failure indication if the integrator output is outside said reference levels.

8. A monitoring device as claimed in claim 7 wherein said display means further comprises a meter having a needle and two positionable meter photodiodes on the face thereof, said photodiodes being positioned to indicate said predetermined reference levels, said needle being deflected in proportion to the output of said integrating means, a light source positioned to illuminate said photodiodes, and detection means responsive to the interruption of the illumination of said photodiodes for indicating whether the integrating means output is inside or outside said reference levels.

9. A monitoring device as claimed in claim 8 wherein said display means further comprises a plurality of indicator means responsive to said gating means and said detecting means for giving visual and audible indication that the output of said integrating means is inside or outside said reference levels.

10. A monitoring device as claimed in claim 9 further comprising means for generating a feedback control signal whereby said welding cycle will be continued until said meter photodiode output indicates that the output of said integrating means is within said preestablished reference levels.